United States Patent
Nelson et al.

(10) Patent No.: US 7,826,739 B2
(45) Date of Patent: *Nov. 2, 2010

(54) DETERMINATION AND ADJUSTMENT OF LASER MODULATION CURRENT IN AN OPTICAL TRANSMITTER

(75) Inventors: Stephen T. Nelson, Santa Clara, CA (US); Timothy G. Moran, San Jose, CA (US)

(73) Assignee: Finisar Corporation, Sunnyvale, CA (US)

( * ) Notice: Subject to any disclaimer, the term of this patent is extended or adjusted under 35 U.S.C. 154(b) by 554 days.

This patent is subject to a terminal disclaimer.

(21) Appl. No.: 11/854,431

(22) Filed: Sep. 12, 2007

(65) Prior Publication Data

US 2008/0069569 A1 Mar. 20, 2008

Related U.S. Application Data

(60) Provisional application No. 60/825,603, filed on Sep. 14, 2006.

(51) Int. Cl.
*H04B 10/08* (2006.01)

(52) U.S. Cl. .......................... 398/22; 398/23; 398/182; 398/164; 398/135; 398/136; 398/192; 372/38.02; 372/34; 372/36; 372/32; 385/89; 385/90; 385/92; 385/93

(58) Field of Classification Search ................ 398/182, 398/183, 186, 187, 188, 192, 193, 194, 196, 398/197, 135, 136, 137, 138, 139, 22, 23, 398/24, 25, 33, 164, 128, 130; 372/32, 34, 372/36, 38.02, 29.015, 38.07, 29.01; 385/88, 385/89, 90, 92, 93

See application file for complete search history.

(56) References Cited

U.S. PATENT DOCUMENTS

| | | | |
|---|---|---|---|
| 6,512,617 B1 | 1/2003 | Tanji et al. | |
| 6,922,421 B2 * | 7/2005 | Robinson et al. | 372/29.015 |
| 7,539,423 B2 * | 5/2009 | Robinson et al. | 398/197 |
| 7,639,952 B2 * | 12/2009 | Nelson | 398/136 |
| 2004/0136708 A1 | 7/2004 | Woolf et al. | |
| 2004/0136720 A1 | 7/2004 | Mahowald et al. | |
| 2006/0110157 A1 | 5/2006 | Tritschler et al. | |

OTHER PUBLICATIONS

U.S. Appl. No. 11/386,374, filed Dec. 29, 2009, Nelson.
U.S. Appl. No. 11/386,374, Mail Date Feb. 11, 2009, Office Action.
U.S. Appl. No. 11/386,374, Mail Date Aug. 14, 2009, Notice of Allowance.

* cited by examiner

*Primary Examiner*—Hanh Phan
(74) *Attorney, Agent, or Firm*—Workman Nydegger

(57) ABSTRACT

Systems and methods for controlling the modulation current of a laser included as a component of an optical transmitter, such as an optical transceiver module, are disclosed. Control of the modulation current, which affects various laser operational parameters, including extinction ratio and optical modulation amplitude, enables operation of the laser to be optimized, thereby enabling reliable transceiver performance to be achieved. In one embodiment, a method for modifying the modulation current in an optical transceiver module includes first sensing analog voltage data that proportionally relates to an actual modulation current of the laser. Once sensed, the analog voltage data are converted to digital voltage data. Using the digital voltage data, the actual modulation current of the laser is determined, then a desired modulation current is determined. Should a discrepancy exist between the actual and desired modulation currents, the actual modulation current is modified to match the desired current.

19 Claims, 5 Drawing Sheets

DETERMINATION AND ADJUSTMENT OF LASER MODULATION CURRENT IN AN OPTICAL TRANSMITTER

CROSS-REFERENCE TO RELATED APPLICATIONS

This application claims the benefit of U.S. Provisional Application No. 60/825,603, filed Sep. 14, 2006, which is incorporated herein by reference in its entirety.

BACKGROUND

1. Technology Field

The present invention generally relates to optical transmitters. In particular, the present invention relates to an optical transmitter capable of measuring and compensating for the modulation current of a laser included in the transmitter such that an optical signal having sufficient optical characteristics is produced.

2. The Related Technology

A properly operating light source is integral to functionality of an optical transmitter. Such light sources, including a laser diode positioned in a transmitter optical subassembly of an optical transceiver module for example, should conform to pre-defined parameters propounded by the manufacturer or applicable industry. These pre-defined parameters involve various characteristics of the optical signal produced by the laser, such as average light level, extinction ratio ("ER"), and optical modulation amplitude ("OMA"). These parameters, which indicate whether the optical signal is adequate for data transmission purposes, are defined by the particular physical transmissive interface, i.e., Fibre Channel, gigabit Ethernet, Sonet, etc.

Various factors can affect the operating parameters of a laser diode during its optical transmission activities, which can correspondingly cause the laser to exceed acceptable ranges for such parameters. One of these factors is modulation current. As is known, the modulation current of the laser diode within an optical transmitter can affect the above-referenced parameters, i.e., average light level, extinction ratio, and optical modulation amplitude. Should any of these parameters exceed predefined acceptable ranges, the optical signal produced by the laser can be adversely affected.

Previously known transceiver designs have typically not enabled the measurement and/or reporting of laser modulation current data, either internally within the transceiver or to an external host with which the transceiver is operably connected. As a result, transceiver operating parameters can be adversely affected by a modulation current that may be out of specification while the transceiver is in use.

Further, the lack of information regarding laser modulation current can result in more lengthy testing processes to be performed at the time of transceiver assembly. In particular, each laser and/or transceiver must typically be tested and adjusted during assembly to ensure that the above and other operating parameters are maintained within specification during laser operation. To the extent that measurement and adjustment for the modulation current is not performed, the process for laser testing is lengthened due to the fact that other, more time consuming procedures must be performed to ensure adequate laser functionality.

Another factor affecting laser functionality relates to the fact that laser operating properties change over the operational lifetime of the laser. Thus, with all other conditions remaining equal, a laser may still fall outside of acceptable parameter ranges as it advances through its operational lifetime. This operational variability over the life of the laser represents another challenge for maintaining the laser modulation current within proper operational parameter ranges.

In light of the above, a need therefore exists for the determination of modulation current associated with the operation of a laser or other light source disposed within an optical transmitter, such as an optical transceiver module. Moreover, a need exists for the ability to adjust for laser modulation current so as to optimize its operation within the transceiver. Any proposed solution to the above should enable determination and/or adjustment of laser modulation current at time of transceiver assembly and/or during in-field transceiver use.

BRIEF SUMMARY

The present invention has been developed in response to the above and other needs in the art. Briefly summarized, embodiments of the present invention are directed to systems and methods for controlling the modulation current of a laser included as a component of an optical transmitter, such as an optical transceiver module. Control of the modulation current, which affects various laser operational parameters, including extinction ratio and optical modulation amplitude, enables operation of the laser to be optimized, thereby enabling reliable transceiver performance to be achieved.

In one embodiment, a method for modifying the modulation current in an optical transceiver module includes first sensing an analog voltage that proportionally relates to an actual modulation current of the laser. Once sensed, the analog voltage is converted to a digital value representative of the analog voltage. Using the digital value, the actual modulation current of the laser is determined, and then a desired modulation current is determined. Should a discrepancy exist between the actual and desired modulation currents, the actual modulation current is modified to match the desired current.

In another embodiment, an optical transmitter including features of the present invention includes a laser and a sensor that senses voltage data relating to a modulation current provided to the laser. A control module is included in the optical transmitter and is capable of determining the actual modulation current of the laser using the voltage data, and modifying the actual modulation current provided to the laser. In this way, laser operation is optimized and certain operating parameters, such as optical modulation amplitude or extinction ratio are maintained within acceptable parameters.

These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof that are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF SELECTED EMBODIMENTS

Reference will now be made to figures wherein like structures will be provided with like reference designations. It is understood that the drawings are diagrammatic and schematic representations of exemplary embodiments of the invention, and are not limiting of the present invention nor are they necessarily drawn to scale.

FIGS. 1-6 depict various features of embodiments of the present invention, which are generally directed to systems and methods for controlling the modulation current of a laser included as a component of an optical transmitter, such as an optical transceiver module. Control of the modulation current, which affects various laser operational parameters including extinction ratio and optical modulation amplitude, enables operation of the laser to be optimized, thereby enabling reliable transceiver performance to be achieved.

In the exemplary embodiments to follow, the laser is included in a transmitter optical subassembly ("TOSA") of an optical transceiver module ("transceiver"). The TOSA, together with a receiver optical subassembly ("ROSA") of the transceiver, include various components to enable the reception and transmission of optical signals to and from a host system that is operably connected to the transceiver. The host system can be included as a node in a communications network, for instance, and can employ the transceiver in communicating via optical signals with other components of the network. Note, however, that the discussion to follow regarding embodiments of the present invention should not be construed as a limiting of the application to such embodiments. Indeed, devices and components apart from transceivers that employ laser devices and other suitable light sources can also benefit from the teachings to be discussed herein.

1. Exemplary Operating Environment

Figure 1:
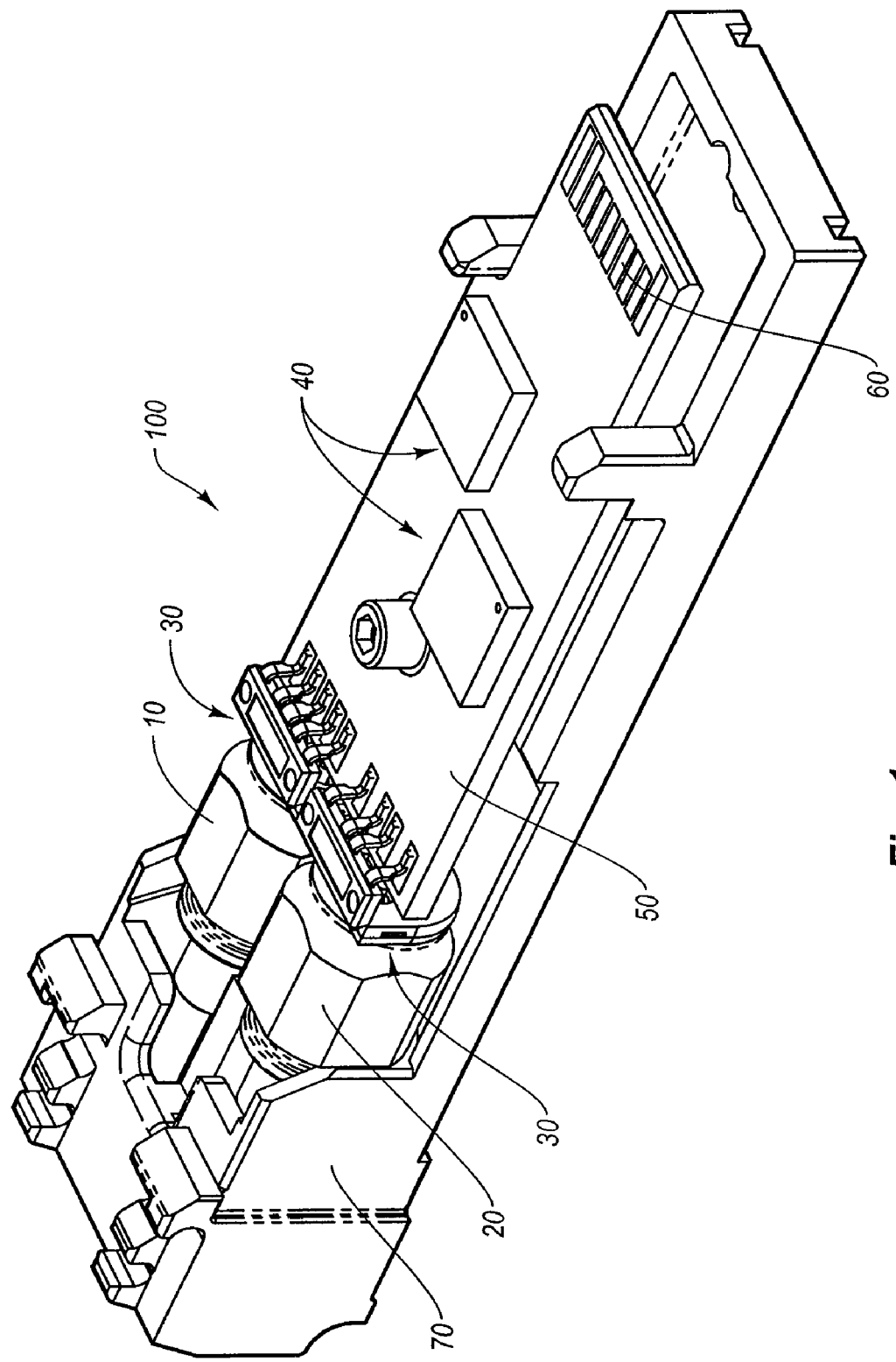
FIG. 1 is a perspective view of an optical transceiver module that is configured in accordance with one embodiment of the present invention.

Reference is first made to FIG. 1, which depicts a perspective view of an optical transceiver module ("transceiver"), generally designated at 100, for use in transmitting and receiving optical signals in connection with an external host that is operatively connected in one embodiment to a communications network (not shown). As depicted, the transceiver shown in FIG. 1 includes various components, including a receiver optical subassembly ("ROSA") 10, a transmitter optical subassembly ("TOSA") 20, electrical interfaces 30, various electronic components 40, and a printed circuit board ("PCB") 50. In detail, two electrical interfaces 30 are included in the transceiver 100, one each used to electrically connect the ROSA 10 and the TOSA 20 to a plurality of conductive pads located on the PCB 50. The electronic components 40 are also operably attached to the PCB 50. An edge connector 60 is located on an end of the PCB 50 to enable the transceiver 100 to electrically interface with a host (not shown here). As such, the PCB 50 facilitates electrical communication between the ROSA 10/TOSA 20, and the host. In addition, the above-mentioned components of the transceiver 100 are partially housed within a shell 70. Though not shown, the shell 70 can cooperate with a housing portion to define a covering for the components of the transceiver 100.

Figure 2:
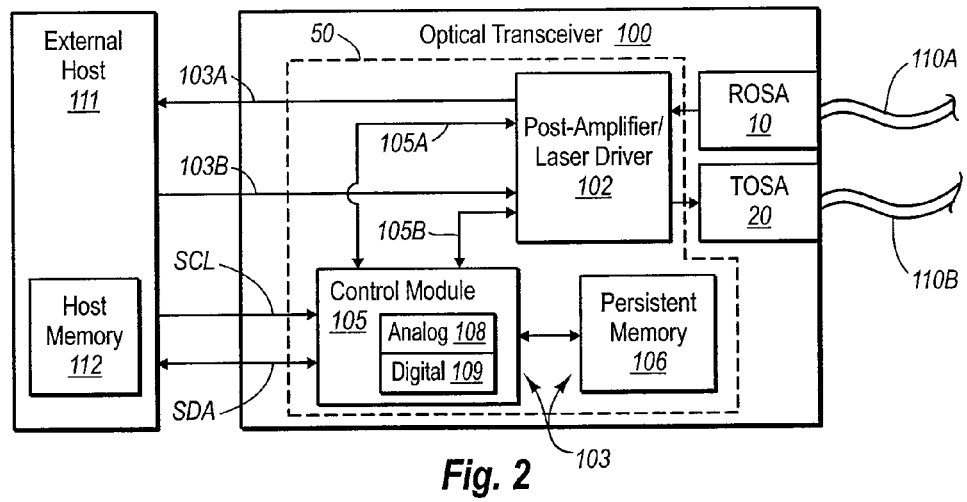
FIG. 2 is a simplified block view showing various aspects of the optical transceiver module of FIG. 1.

Reference is now made to FIG. 2, which is a simplified block diagram of the transceiver 100 of FIG. 1, depicting various physical and operational aspects thereof. While the optical transceiver 100 will be described in some detail, the optical transceiver 100 is described by way of illustration only, and not by way of restricting the scope of the invention. As mentioned above, the optical transceiver 100 in one embodiment is suitable for optical signal transmission and reception at a variety of per-second data rates, including but not limited to 1 Gbit, 2 Gbit, 4 Gbit, 8 Gbit, 10 Gbit, or higher bandwidth fiber optic links. Furthermore, the principles of the present invention can be implemented in optical transceivers of any form factor such as XFP, SFP and SFF, without restriction.

In operation, the optical transceiver 100 receives an optical signal from a fiber 110A via the ROSA 10 in manner to be described more fully below. The ROSA 10 acts as an optoelectric transducer by transforming the received optical signal into an electrical signal. The ROSA 10 provides the resulting electrical signal to a post-amplifier. In the illustrated embodiment, the post amplifier is consolidated with a laser driver as an integrated laser driver/post amplifier ("LDPA") 102. As such, the LDPA 102 resides on a single integrated circuit chip and is included as a component, together with the other electronic components 40, some of which are further described below, on the printed circuit board ("PCB") 50. Further details regarding the integrated LDPA 102 can be found in U.S. patent application Ser. No. 10/970,529, entitled "Integrated Post Amplifier, Laser Driver, and Controller," filed Oct. 21, 2004 (the "'529 Application"), which is incorporated herein by reference in its entirety. In other embodiments, the post amplifier and laser driver can be included as separate components on the PCB 50.

The post-amplifier portion of the LDPA 102 amplifies the electrical signal and provides the amplified signal to an external the host 111 as represented by arrow 103A. The external host 111 may be any computing system capable of communicating with the optical transceiver 100. The external host 111 may contain a host memory 112 that may be a volatile or non-volatile memory source.

The optical transceiver 100 may also receive electrical signals from the host 111 for transmission onto a fiber 110B. Specifically, the laser driver portion of the LDPA 102 receives the electrical signal as represented by the arrow 103B, and drives a laser within the TOSA 20 with signals that cause the TOSA to emit onto the fiber 110B optical signals representative of the information in the electrical signal provided by the host 111. Accordingly, the TOSA 20, which corresponds to the TOSA shown in FIG. 1, serves as an electro-optic transducer.

The behavior of the ROSA 10, the LDPA 102, and the TOSA 20 may vary dynamically due to a number of factors. For example, temperature changes, power fluctuations, and feedback conditions may each affect the performance of these components. Accordingly, the transceiver 100 includes a control module 105, which may evaluate environmental conditions, such as temperature, and/or operating conditions, such as voltage, and receive information from the post-amplifier portion of the LDPA 102 (as represented by arrow 105A) and from the laser driver portion of the LDPA (as represented by arrow 105B). This allows the control module 105 to optimize the dynamically varying performance, as will be described in greater detail below. The control module 105, the post-amplifier 102, and the laser driver 103 may be the same chip, as disclosed in the '529 Application. Alternatively, they may be distributed across two or more chips on the PCB 50.

Specifically, the control module 105 may optimize the operation of the transceiver 100 by adjusting settings on the LDPA 102 as represented by the arrows 105A and 105B. These settings adjustments can be intermittent and made when temperature or voltage or other low frequency changes so warrant, or can be periodically performed in accordance with a scheduled pattern.

The control module 105 may have access to a persistent memory 106, which in one embodiment, is an electrically erasable and programmable read only memory ("EEPROM"). Persistent memory 106 may also be any other non-volatile memory source.

The persistent memory 106 and the control module 105 may be packaged together in the same package or in different packages without restriction. Data and clock signals may be provided from the host 111 to the control module 105 using the serial clock line SCL, and the serial data line SDA. Also data may be provided from the control module 105 to the host 111 using serial data signal SDA to allow for transmitting diagnostic data such as environmental and/or operational parameters. The control module 105 includes both an analog portion 108 and a digital portion 109. Together, they allow the control module to implement logic digitally, while still largely interfacing with the rest of the optical transceiver 100 using analog signals.

As used herein, the term "diagnostic data" will refer to both environmental parameters and operational parameters, whether the parameter is provided as raw data or processed data. Diagnostic data can be provided in analog or digital form. Environmental parameters may be, for example, supply voltage, humidity, acceleration, ambient light levels, ambient vibration, magnetic flux intensity, ambient interior transceiver temperature, or any other environmental parameter that may affect the performance of an optoelectronic device and that may be compensated for by suitable adjustment of one or more operational parameters. Environmental parameters may also be independent of the operation of the optoelectronic device, but may, nevertheless, affect operational parameters.

Operational parameters relate directly to operation of the transceiver and include, for example, laser wavelength, laser temperature, transceiver temperature, laser bias current, laser modulation current, Thermo Electric Cooler ("TEC") current, laser transmit power, receive power, and the like.

Operational parameters can also include statistical information such as, for example, total operational time, average operational time between boots, total number of error conditions encountered, identification of one or more error conditions encountered, categorization of the number of error conditions encountered for a plurality of different error types, number optical transceiver boot-ups, and the like.

Figure 3:
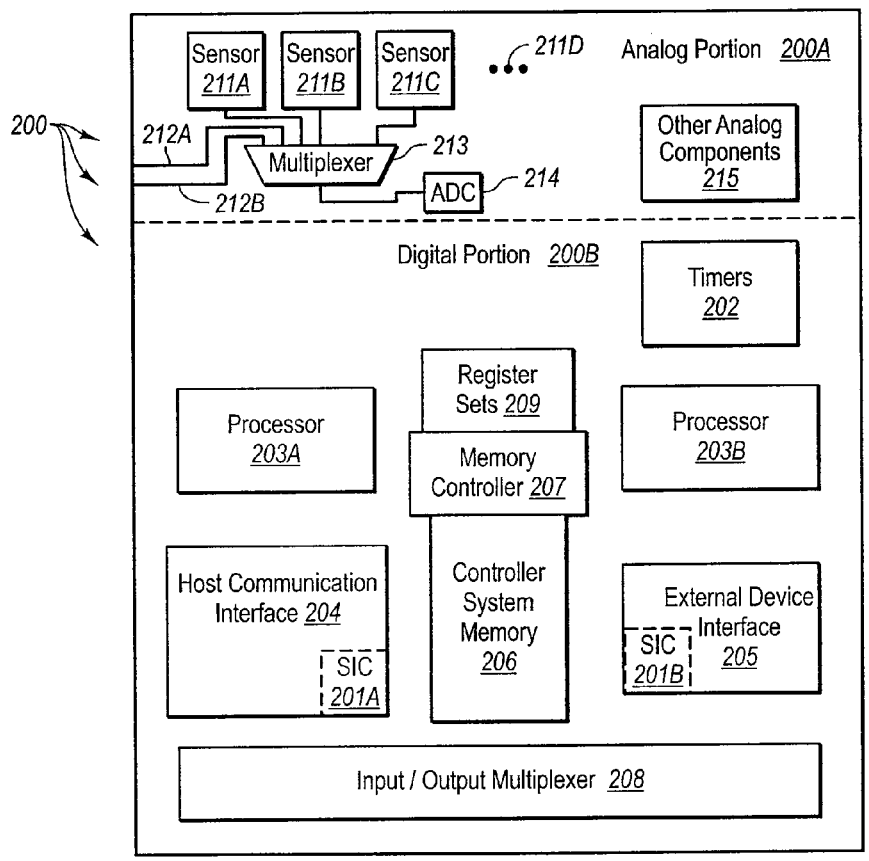
FIG. 3 is a simplified block view of an integrated circuit control module included in the optical transceiver module shown in FIG. 2.

FIG. 3 schematically illustrates an exemplary configuration 200 of the control module 105 in further detail. The control module 200 includes an analog portion 200A that represents an example of the analog portion 108 of FIG. 2, and a digital portion 200B that represents an example of the digital portion 109 of FIG. 2. For example, the analog portion 200A may contain digital to analog converters, and analog to digital converters, high speed comparators (e.g., for event detection), voltage-based reset generators, voltage regulators, voltage references, clock generator, and other analog components. For example, the analog portion includes sensors 211A, 211B, 211C amongst potentially others as represented by the horizontal ellipses 211D. Each of these sensors may be responsible for measuring environmental and/or operational parameters that may be measured from the control module 200 such as, for example, supply voltage and transceiver temperature. The control module may also receive external analog or digital signals from other components within the optical transceiver. Two external lines 212A and 212B are illustrated for receiving such external analog signals although there may be many of such lines.

The internal sensors 211A through 211D may generate analog signals that represent the measured values. In addition, the externally provided signals 212A, 212B may also be analog signals. In this case, the analog signals are converted to digital signals so as to be available to the digital portion 200B of the control module 200 for further processing. Of course, each analog parameter value may have its own Analog to Digital Converter ("ADC"). However, to preserve chip space, each signal may be periodically sampled in a round robin fashion using a single ADC such as ADC 214 illustrated in FIG. 3. In this case, each analog value may be provided to a multiplexer 213, which selects in a round robin fashion, one of the analog signals at a time for sampling by the ADC 214. Alternatively, multiplexer 213 may be programmed to allow for any order of analog signals to be sampled by ADC 214.

As previously mentioned, the analog portion 200A of the control module 200 may also include other analog components 215 such as, for example, digital to analog converters, other analog to digital converters, high speed comparators (e.g., for event detection), voltage-based reset generators, voltage regulators, voltage references, clock generators, and other analog components.

The digital portion 200B of the control module 200 may include a timer module 202 that provides various timing signals used by the digital portion 200B. Such timing signals may include, for example, programmable processor times. The timer module 202 may also act as a watchdog timer.

Two general-purpose processors 203A and 203B are also included. The processors recognize instructions that follow a particular instruction set, and may perform normal general-purpose operation such as shifting, branching, adding, subtracting, multiplying, dividing, Boolean operations, comparison operations, and the like. In one embodiment, the general-purpose processors 203A and 203B are each a 16-bit processor and may be identically structured. The precise structure of the instruction set is not important to the principles of the present invention as the instruction set may be optimized around a particular hardware environment, and as the precise hardware environment is not important to the principles of the present invention. Also, though one or both processors may be used in connection in the description to follow, a dual-processor configuration is not required to practice embodiments of the present invention.

A host communications interface 204 is used to communicate with the host 111 using the serial data ("SDA") and serial clock ("SCL") lines of the optical transceiver 100 (FIG. 2). The external device interface 205 is used to communicate with, for example, other modules within the optical transceiver 100 such as, for example, the post-amplifier 102, the laser driver 103, or the persistent memory 106.

The internal controller system memory 206 (not to be confused with the external persistent memory 106) may be Random Access Memory ("RAM") or non-volatile memory. The memory controller 207 shares access to the controller system memory 206 amongst each of the processors 203A and 203B and with the host communication interface 204 and the external device interface 205.

In one embodiment, the host communication interface 204 includes a serial interface controller 201A, and the external device interface 205 includes a serial interface controller 201B. The two serial interface controllers 201A and 201B may communicate using a two-wire or other suitable serial interface so long as the interface is recognized by both communicating modules. One serial interface controller (e.g., serial interface controller 201B) is a master component, while the other serial interface device (e.g., serial interface device 201A) is a slave component.

An input/output multiplexer 208 multiplexes the various input/output pins of the control module 200 to the various components within the control module 200. This enables different components to dynamically assign pins in accordance with the then-existing operational circumstances of the control module 200. Accordingly, there may be more input\output nodes within the control module 200 than there are pins available on the control module 200, thereby reducing the footprint of the control module 200.

Having described a specific environment with respect to FIGS. 1-3, it will be understood that this specific environment is only one of countless architectures in which the principles of the present invention may be employed. As previously stated, the principles of the present invention are not intended to be limited to any particular environment.

Referring to FIGS. 2 and 3, control module 200 executes microcode received from a source. Specifically, processors 203A and 203B load microcode from the source into the controller system memory 206. While system memory may be RAM, it may also be a register, flip-flop or other memory device. For example, the processors 203 may load microcode stored in persistent memory 106 into controller system memory 206. The microcode from persistent memory 106 may include functions that direct which operational parameters to measure.

2. Laser Modulation Current Control

Figure 4:
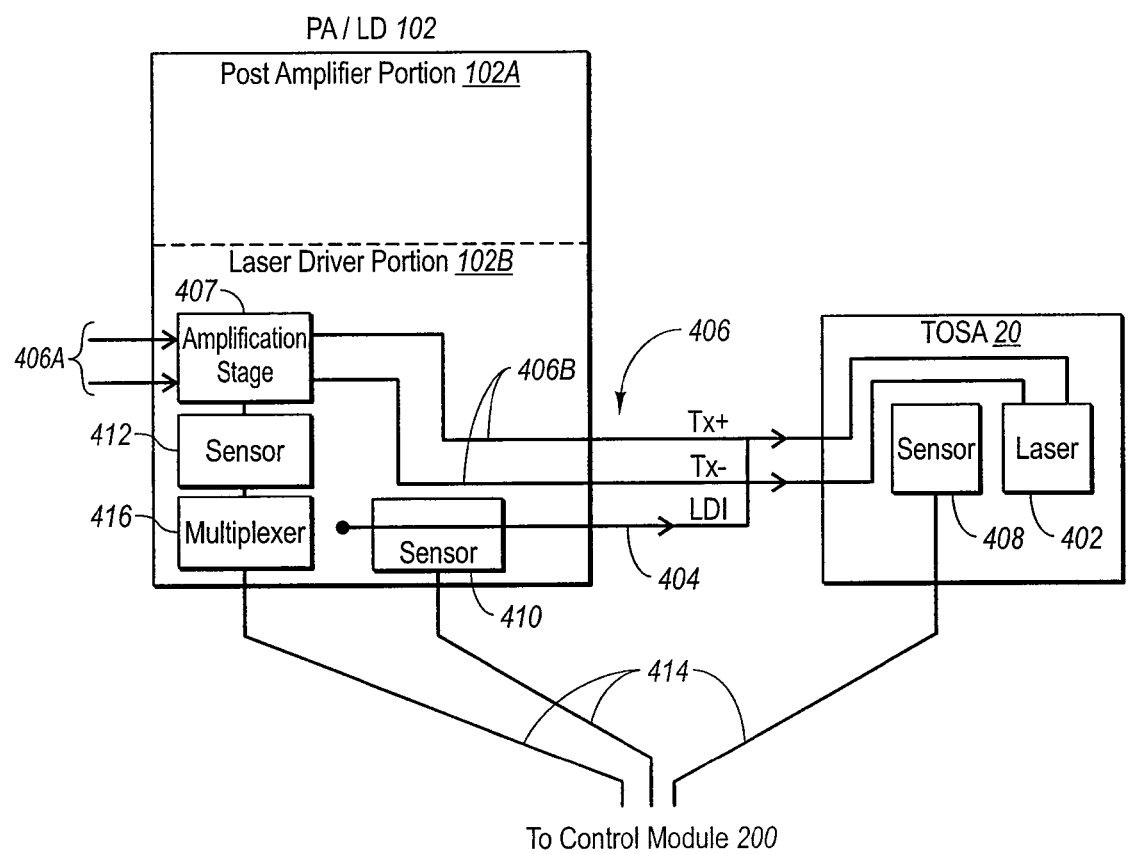
FIG. 4 is a simplified block view of the post amplifier/laser driver and TOSA shown in FIG. 2, illustrating further details thereof.

Together with FIGS. 1-3, reference is now made to FIG. 4. In general, the operating environment described above, including the transceiver 100, is exemplary of one environment in which principles of the present invention can be practiced. In particular, embodiments of the present invention enable determination and control of modulation current provided to a laser diode or other suitable light source disposed within an optical transmitter, such as the transceiver 100 detailed above. This enables operation of a transceiver or other suitable device in which the laser or light source to be optimized not only in terms of modulation current, but also in terms of extinction ratio or optical modulation amplitude, transceiver parameters that relate to modulation current provided by the transceiver to the laser. Control of modulation current as explained herein is further benefited by the digital control offered by a control module such as the control module 200 described in connection with FIG. 3 above, as will be seen.

In particular, FIG. 4 further describes various components of the LDPA 102 and TOSA 20 of FIG. 2, which relate to determination and control of laser modulation current, according to one example embodiment of the present invention. As shown, the LDPA 102 includes a post amplifier portion 102A and a laser driver portion 102B. Though shown in the illustrated embodiment as a unified component, the LDPA can also be separated into discrete post amplifier and laser driver portions in alternative embodiments. The TOSA 20 includes a light source, such as a laser 402. The laser 402 can be a vertical cavity surface emitting laser ("VCSEL"), a distributed feedback ("DFB") laser, or the like. As detailed above, during transceiver operation the TOSA 20 is responsible for providing a data-containing optical signal for launching on to an optical fiber, such as the fiber 110B shown in FIG. 2. In particular, the laser 402 is employed to convert an electrical data signal received from the external host 111 (FIG. 2) into an optical data signal, as already described, in order to enable the transmission of desired data via the fiber 110B.

The electrical data signal is supplied to the laser 402 via a pair of differential signal lines 406, shown in FIG. 4. Each signal line of the differential signal line pair carries one of two streams of differential electrical data that differ from each other only in signal polarity. As such, the lines are respectively indicated with a "TX+" or a "TX−" indicator, indicating the respective positive or negative polarity of each line. Note that the differential signal line pair 406 of FIG. 4 corresponds to the line indicated at 103B in FIG. 2 extending from the external host 111 to the LDPA 102.

In further detail, the differential signal lines 406 are subdivided in the present embodiment to include a first signal line portion 406A extending from the host 111 to an amplification stage 407 in the LDPA 102, and a second signal line portion 406B extending from the amplification stage 407 to the laser 402 of the TOSA 20. The differential data signal carried by the second signal line portion pair 406B is implemented in the form of and referred to herein as a "modulation current." The amplification stage 407 of FIG. 4 represents one or more components that are used to condition the data signal carried by the first signal line portion pair 406A prior to conversion into an optical signal for transmission by the transceiver 100.

A laser DC current ("LDI") signal line 404 is also shown in FIG. 4 extending from the LDPA 102 to the differential signal lines 406. The purpose of the signal line 404 is to provide a sufficient "base" current for the lasing function of the laser 402, which base current is then modified by the modulation current described above in order to modulate the optical signal of the laser to produce optical signals that represent the digital "1"'s and "0"'s carried by the differential signal lines. This base current carried by LDI signal line 404 is referred to herein as "bias" or "DC" current. Note that laser 402 may be a directly modulated laser, such as, but not limited to, a Vertical Cavity Surface Emitting Laser (VCSEL), Distributed Feedback (DFB) and Fabry-Perot (FP) lasers. As is known in the art, DFB and FP lasers are examples of edge emitting lasers.

FIG. 4 further shows a plurality of sensors that are placed in relation to the LDPA 102 and TOSA 20 in order to enable data regarding the operation of the laser 402 to be sensed. A sensor 408 is placed in relation to the laser 402 in order to sense the power of the optical signal emitted by the laser during operation. In such an embodiment, the sensor 408 is a photodiode that is configured to sense a portion of the light emitted by the edge-emitting laser 402.

In further detail, upon sensing the light a resultant current is produced by the photodiode sensor 408, which current can then be extrapolated to yield a measurement of the laser power of the laser 402. The current produced by the photodiode sensor 408 is an analog signal that can be forwarded to the control module 200 via a corresponding signal line 414, as shown in FIG. 4.

In other embodiments, the laser 402 and sensor 408 can include other device combinations in addition to the combination explicitly described herein. Thus, the sensor 408, in addition to the other sensors to be described herein, can be selected so as to suitably operate in connection with the component for which operating measurements are desired.

A sensor 410 is positioned in relation to the bias current signal line 404 in order to sense the quantity of bias current being supplied by the line to the laser 402 during transceiver operation. As mentioned, the sensor 410 can include one of a variety of sensor types, however in the present embodiment the sensor is implemented as a resistor placed in-line with the signal line 404. Thus, measurement of the voltage drop across the resistor provides an analog result that can be extrapolated to determine the amount of bias current in the signal line 404. As with the sensor 408, this analog information can be forwarded to the control module 200 via the corresponding signal line 414.

In accordance with the present embodiment, a sensor 412 is placed in relation to the differential signal lines 406 in order to detect the amount of modulation current that is supplied to the laser 402 during transceiver operation. In the present embodiment, the sensor 412 is placed in operable communication with the amplification stage 407, which in turn is in operable communication with the differential signal lines 406. In a manner to be described further below, analog data sensed by the sensor 412 are used to determine the amount of modulation current carried in one or both of the signal lines 406. As with the sensors 408 and 410, these analog data can then be forwarded to the analog portion 200A of the control module 200 via the corresponding signal line 414.

Note that, collectively, the signal lines 414 shown in FIG. 4 in one embodiment correspond graphically to the signal line 105B disposed between the LDPA 102 and the control module 105 in FIG. 2, which control module is identically represented at 200 in FIG. 3. In addition, one or more of the sensors 211 A-C of the analog portion 100A of the control module 200 can alternatively be used in the place of the above-mentioned sensors. Also, the sensors shown in FIG. 4 can be configured to forward digital data directly to the digital portion of the control module in one embodiment. These and other possible variations of the above description are therefore contemplated as included within the principles of the present invention.

In the illustrated embodiment, the analog data sensed by the sensor 412 can be forwarded to the control module 200 via an input/output multiplexer 416. In addition, data sensed by the sensors 408 and 410 can also be routed via the multiplexer 416, if desired.

As has been explained, each of the analog signals sensed by the sensors 408, 410, and 412 is forwarded via corresponding signal lines 414 to the control module 200 (FIG. 3). The control module 200 is employed, as will be seen below, in determining and controlling modulation current for the laser 402.

Figure 5:
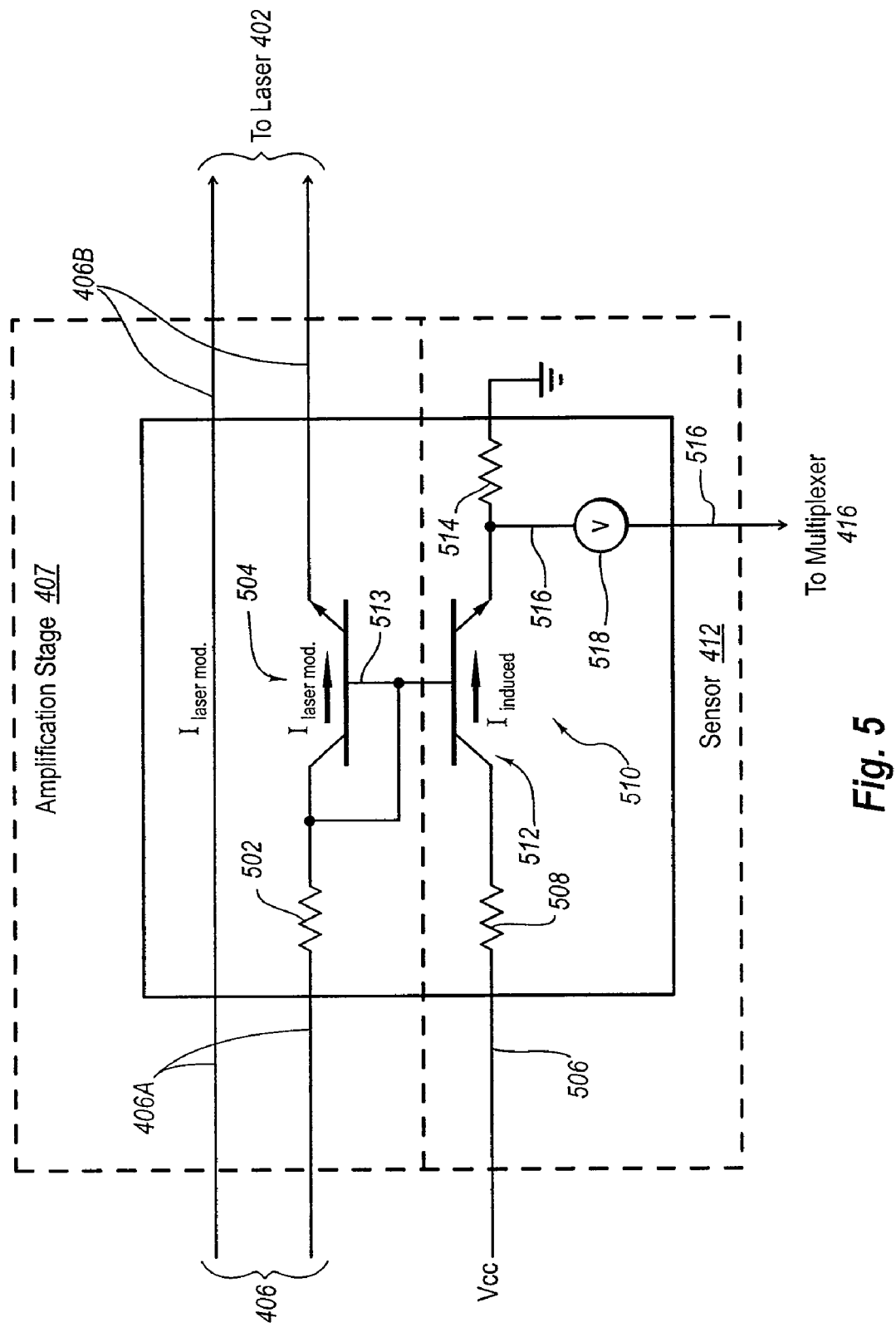
FIG. 5 is a simplified block view of certain components of the post amplifier/laser driver shown in FIG. 4, illustrating various details thereof.

Reference is now made to FIG. 5, which depicts various details regarding one possible sensor that can be employed according to one example embodiment of the present invention for determining laser modulation current. Note that the sensor to be described below in connection with FIG. 5, however, is merely exemplary, and is not meant to limit the present invention in any way as other sensor could alternatively be employed.

In particular, FIG. 5 shows in simplified detail the amplification stage 407 and sensor 412 of the laser driver portion 102B of the LDPA 102 shown in FIG. 4. The view of the amplification stage 407 in FIG. 5 includes the differential signal lines 406—the first signal line portions 406A entering the amplification stage, and the second signal line portions 406B exiting the amplification stage. As previously mentioned, the second signal line portions 406B carry the laser modulation current, and as such are designated in FIG. 5 with "$I_{laser\ mod}$."

In further detail, the amplification stage 407 in the present embodiment includes a resistor 502 and a first transistor 504 on one of the differential signal lines 406. In the sensor 412, an input signal line 506 carrying signal "Vcc" passes into the sensor. Like the amplification stage 407, the input signal line 506 includes a resistor 508 and a second transistor 512. The first transistor 504 is operably connected to the second transistor 512, as indicated by a connecting line 513.

The arrangement and interconnection of the first and second transistors 504 and 512 described above, commonly known as a "current mirror" arrangement, enables an indirect measurement of the laser modulation current, $I_{laser\ mod.}$, to be acquired by the sensor 412. In particular, because of the operable interconnection of the first and second transistors 504 and 512 via connecting line 513, passage of the laser modulation current, $I_{lasermod.}$, through the first transistor 504 induces the creation of a proportionate current, "$I_{induced}$," in the second transistor 512. The induced current can have a 1:1 correspondence with the modulation current, or some other fractional correspondence, according to the particular configuration of the circuit. As such, it is appreciated that the particular details regarding the sensor 412 and its interconnection with the amplification stage 407 can vary from what is explicitly described herein.

A voltage 518 proportional to the induced current, $I_{induced}$, can then be detected on signal line 516 at a point prior to a resistor 514, which is also included on the input signal line 506. The voltage 518 in the illustrated embodiment is in analog format and is forwarded to the multiplexer 416 (FIG. 4), before being forwarded to the analog portion 200A of the control module 200 (FIG. 3), where conversion into digital voltage data can be performed by the ADC 214 or other suitable converter.

Once converted to a digital format, the voltage data are forwarded to the control module digital portion 200B, where one or both processors 203A and 203B can be employed to determine the laser modulation current via comparison or analysis of the voltage data relating to the current induced in the second transistor 512. Once the modulation current of the laser 402 is known, various actions may be taken: adjustments can be made by the control module to alter the laser modulation current in accordance with a pre-defined set-point, such as a pre-defined modulation current setting, or in response to current conditions; or the modulation may simply be reported, such as to the external host 111 (FIG. 2) as a digital diagnostic value. As will be discussed in further detail below, data regarding the laser modulation current can be used during transceiver assembly when the laser is calibrated, or during in-field use, when dynamic adjustments to the laser may need to be made, either autonomously by the transceiver, or by the external host.

Note that, though the above discussion describes use of a control module having one or more processors capable of executing microcode in determining laser modulation current, in other embodiments it is possible to employ a non-processor based control module to determine modulation current. One example of such a control module includes a gate array having programmable logic gates.

Also, note that, while it is shown in FIG. 5 as being operably connected to only one of the differential signal lines 406, the current mirror 510 or other suitable sensor can in one embodiment be operably connected to both differential signal lines.

In accordance with one embodiment, therefore, a method is followed to determine and control modulation current for a laser, such as the laser 402 of the transceiver 100. This method can be followed at time of transceiver assembly, or during in-field operation of the transceiver. This method is generally depicted at 600 in FIG. 6. In a first stage 602, voltage data relating to the modulation current of the laser 402 are sensed. In one embodiment, the data sensed in this stage are analog data, and are gathered by the sensor 412 shown in FIGS. 4 and 5. Specifically, analog data relating to the amount of modulation current that carried by one of the differential signal lines 406 can be obtained by the sensed voltage 518 of an induced current, $I_{induced}$, produced in the second transistor 512 of the current mirror 510, which is positioned in the sensor 412 and amplification stage 417 of the LDPA laser driver portion 102B, as described above. These analog voltage data relating to the sensing of the sensor 412 are forwarded to the control module 200 via the multiplexer 416 and signal lines 414, as has been described.

In stage 604, the analog voltage data are converted to digital data. As mentioned, in one embodiment the control module 200 shown in FIG. 3 accesses the analog data. Such accessing of the analog data can be performed by transmission of the data from the sensor 412 via the signal lines 414 to the analog portion 200A of the control module via signal lines 212A, 212B, or other suitable signal lines. The data received by signal lines 212A and 212B can then be forwarded to the analog-to-digital ("ADC") converter 214 shown in the analog portion 200A of the control module 200 for conversion into digital data. In another embodiment, however, the analog data sensed by the sensor 412 can be converted from analog to digital data via an analog-to-digital converter (not shown) located in the LDPA 102 itself. In yet another embodiment, the analog-to-digital converter can be positioned exterior to both the LDPA 102 and the control module 200. In such an instance, the signal lines 414 can be forwarded and connected to the converter for conversion of the analog data to digital data before being forwarded to the digital portion 200B of the control module 200 via the external device interface 205, for instance. Thus, the illustrated configuration as shown in FIGS. 3 and 4 is not to be considered restrictive of the present invention in any way.

In stage 606, the actual modulation current of the laser is determined. This determination is made using the digital voltage data of the current mirror 510 as measured by the voltmeter 516, converted and forwarded to the digital portion 200B of the control module 200 as described above. In one embodiment, the digital voltage data is received by the controller system memory 206, then processed immediately or at the appropriate time by one or both processors 203A, B. In determining the modulation current of the laser 402 from the sensed digital voltage data sensed from the induced current, $I_{induced}$, of the second transistor 512, the processor(s) 203A, B can consult look-up tables stored in the controller system memory 206 or persistent memory 106 (FIG. 2, 3). These look-up tables relate the amount of sensed voltage 518 with the corresponding amount of modulation current present in the differential signal lines 406, according to known characteristics regarding current induction caused by the modulation current in the current mirror 510.

In addition to look-up tables, other techniques can be executed by the processor(s) 203A, B or other control module component in order to determine the actual laser modulation current as detected by the sensor 412. For instance, in one embodiment laser modulation current calculations can be performed by the processor(s) to convert the raw data into useful units. The raw data could have a linear relationship to the actual modulation current and could be converted using known slope efficiency and offset values for the laser. Using slope and offset values the raw digital data can be converted to actual modulation current. These and other alternative methods can also be used to determine the actual modulation current.

In stage 608, a desired modulation current is determined. This can be autonomously performed in one embodiment by the control module 200 based on measurement of various digital diagnostics relating to the operation of the transceiver 100. In another embodiment, the desired modulation current can be input into one of the control module register sets 209 or other suitable location by the external host 111 or by a technician during in-field use or at time of transceiver assembly.

With further respect to determination of a desired modulation current in stage 608, it is appreciated that the determination of the actual laser modulation current in stage 606 is useful in maintaining certain operational parameters, such as optical modulation amplitude ("OMA") or extinction ratio ("ER") of the laser 402, at acceptable levels during transceiver operation. In general, ER is a ratio of: 1) the difference between a "dark level" of the laser, i.e., a point at which no light is produced by the laser, and the low light (logic "0") level; and 2) the difference between the dark level and the high light (logic "1") level. OMA is a measure of the difference between the high light level and the low light level and is directly related to extinction ratio.

In determining OMA or ER, it is necessary to first determine, in addition to modulation current, the laser slope efficiency, or "LSE." LSE represents a ratio of the optical power output, or laser power, of a laser versus the amount of electrical current, or laser current, provided to the laser during operation. On a more basic level, LSE is a measure of the number of photons produced by the laser for a given amount of current supplied to the laser during operation.

OMA and ER are operating parameters that are not directly measurable by the sensors typically employed within the transceiver. However, the related parameters of laser modulation current and LSE can be used to determine OMA and ER. In other words, both ER and OMA are affected by the laser modulation current and LSE, and as such, it is necessary to know these latter quantities when desiring to maintain laser OMA or ER at acceptable levels, or to set the laser at a particular OMA or ER level.

In light of the above, calculation of LSE is included as a component in determining a desired modulation current in stage 608. In brief, LSE is calculated by varying the laser bias current provided to the laser 402 to a plurality of current levels. Analog laser bias current and laser transmit power data relating to the variance of the laser bias current are then sensed. Specifically, analog data relating to the amount of laser bias current that is varied can be obtained by the sensor 410 positioned in the LDPA 102. Similarly, the amount of corresponding variance in laser transmit power as a result of the bias current variance can be sensed by sensor 408 in the TOSA 20, which in one embodiment is a photodiode, as has been explained.

The analog data relating to the laser bias current and laser power are forwarded to the control module 200 and converted to digital data. The laser slope efficiency is then calculated by the processor(s) 203A, B from the digital data received by the control module 200 by determining the relationship between laser bias current input and its resultant laser transmit power. Further details regarding the determination of laser slope efficiency can be found in U.S. application Ser. No. 11/386, 374, entitled "System and Method for Compensating For Laser Slope Efficiency in an Optical Device," filed Mar. 22, 2006, which is incorporated herein by reference in its entirety.

As part of stage 608, once laser slope efficiency is known, this information can be coupled with the laser modulation current, previously determined in stage 606, in order to determine a desired modulation current. Again, the determination in stage 608 once the LSE and actual laser modulation current are known can be autonomously executed by the processor(s) 203A, B within the transceiver 100. In other embodiments this portion of the determination of stage 608 can be executed by the external host 111, or by a technician during transceiver assembly.

In stage 610, should a difference exist between the laser modulation current determined in stage 606 and the desired laser modulation current as determined in stage 608, the transceiver 100 or an external source, i.e., the external host 111 or a technician during transceiver assembly, adjusts the modulation current provided to the laser 402 during operation in an amount sufficient to match the actual modulation current, either higher or lower, to the desired modulation current level. This adjustment may be necessary in order to maintain the laser at the desired extinction ratio ("ER") or optical modulation amplitude ("OMA"), as discussed above.

In one embodiment any discrepancy existing between the actual laser modulation current and the desired modulation current can be corrected by sending instructions from the control module 200 to the LDPA 102 to modify the laser modulation current as needed. Such instructions from the control module 200 can be sent by the external device interface 205 to the LDPA 102. In another embodiment, the digital instructions for modifying the laser modulation current can be converted to analog instructions by the analog portion 200A before transmission to the LDPA 102. In yet another embodiment, a digital-to-analog converter can be placed in the LDPA 102 or other location to convert the digital control module instructions into analog instructions before use by the LDPA. In any event, once the instructions are received, the LDPA 102 modifies the laser modulation current to match the desired modulation current.

Of course, it may be the case that no discrepancy exists between the actual and desired laser modulation current. If so, no adjustment is required at stage 610. Also, in one embodiment, it may be desirable only to determine the actual laser modulation current for reporting purposes. In this case, stages 608 and 610 would not be performed.

Optionally, the sensor 412 can be employed in a feedback mode to ensure proper modulation current is achieved and maintained. In this way, laser operation is optimized according to the current laser slope efficiency of the laser 402 during transceiver operation. Such a feedback mode can be achieved via an analog feedback loop included in the LDPA 102 or in a feedback loop established between the sensor and the control module 200. In the latter case, this enables the control module to make periodic adjustments to the laser modulation current by sensing current modulation current and comparing it to the desired current setting.

Figure 6:
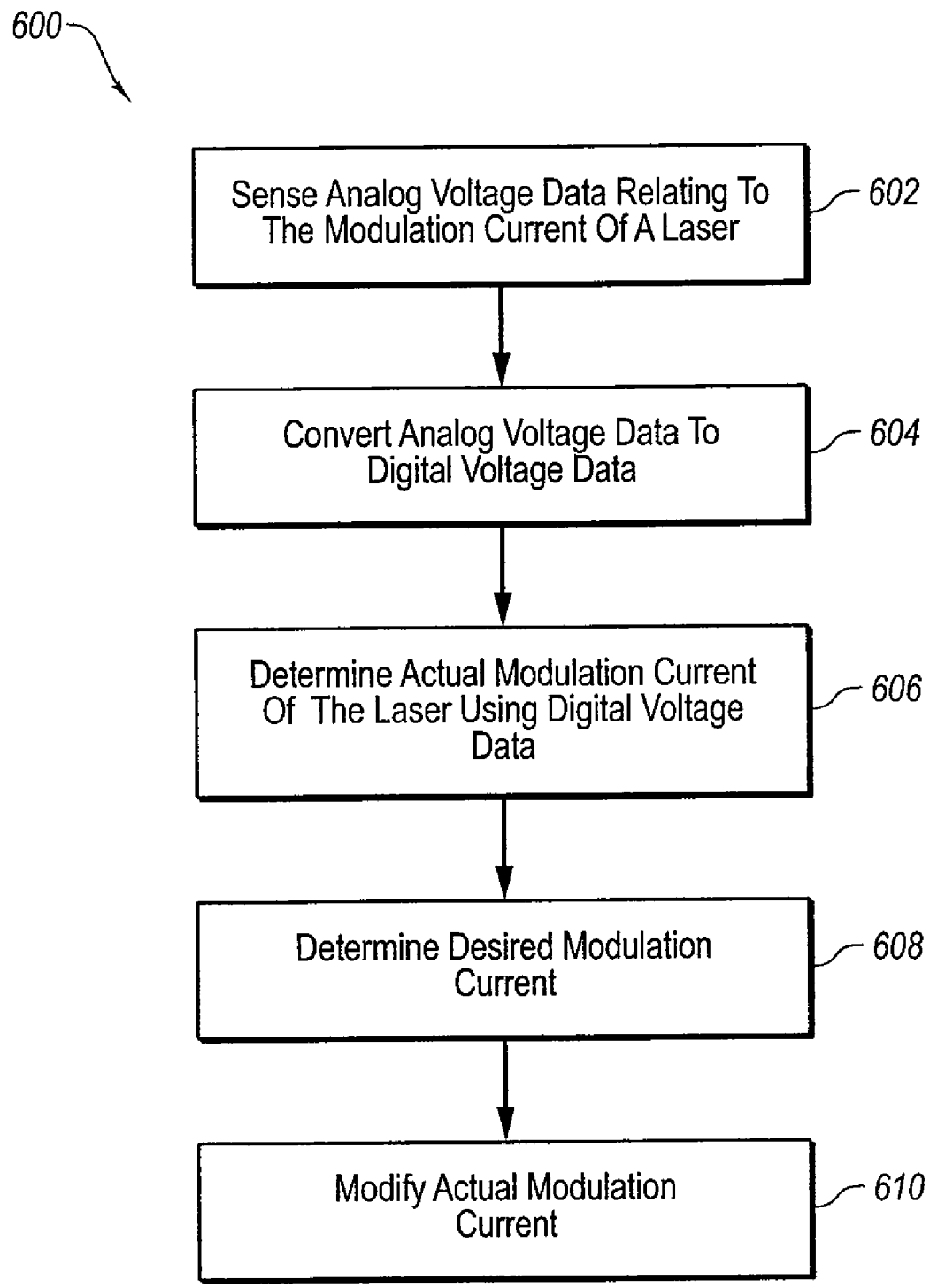
FIG. 6 is a flow chart depicting various stages of a method for controlling laser modulation current, according to one embodiment of the present invention.

Use of the method described in FIG. 6 in one embodiment enables laser calibration to be performed at time of transceiver assembly while obviating the need for extensive laser testing. In detail, if the operating behavior of the laser installed in the transceiver is generally understood, especially with respect to how the laser reacts to changes in modulation current, the actual laser modulation current of the laser can be determined using the above method. Then, the actual laser modulation current can be adjusted to bring it into alignment with the desired laser modulation current. No further testing of the laser will then be required, thereby saving testing resources, assembly time, and manufacturing costs.

Further, embodiments of the present method can be executed to identify lasers or other transceiver components that are not properly operating in-field.

The present invention may be embodied in other specific forms without departing from its spirit or essential characteristics. The described embodiments are to be considered in all respects only as illustrative, not restrictive. The scope of the invention is, therefore, indicated by the appended claims rather than by the foregoing description. All changes that come within the meaning and range of equivalency of the claims are to be embraced within their scope.

What is claimed is:

1. A method for determining the modulation current provided to a laser of an optical transmitter, the method comprising:

sensing analog data relating to the actual modulation current of the laser, wherein the sensing is at least partially performed by a first transistor having a collector coupled to one portion of a differential pair that carries the modulation current, the collector coupled to the base in a diode connection, and an emitter coupled to the laser and a second transistor having a base coupled to the base of the first transistor, a collector coupled to a voltage source and an emitter coupled to a sensed voltage of an induced current that passes through the second transistor, the induced current being induced by the modulation current passing through the first transistor;

converting the analog data to digital data; and determining the actual modulation current using the digital data.

2. The method for determining as defined in claim 1, wherein sensing the analog data further comprises:

sensing analog voltage data relating to the modulation current of the laser.

3. The method for determining as defined in claim 2, wherein sensing the analog data further comprises:

sensing analog voltage data relating to the current that is induced by the modulation current of the laser.

4. The method for determining as defined in claim 1, wherein the optical transmitter is an optical transceiver module, and wherein at least a portion of the modulation current is provided by differential signal lines of the optical transceiver module.

5. The method for determining as defined in claim 1, wherein sensing analog data, converting the analog data, and determining the modulating current are executed by a control module of the optical transmitter.

6. The method for determining as defined in claim 1, further comprising:

reporting the actual modulation current to an entity external to the optical transmitter.

7. The method for determining as defined in claim 1, wherein the determined actual modulation current is used to calibrate at least one operating parameter of the laser.

8. An optical transmitter, comprising:

a laser;

a sensor that senses voltage data relating to a modulation current provided to the laser, wherein the sensor at least partially comprises a first transistor having a collector coupled to one portion of a differential pair that carries the modulation current, the collector coupled to the base in a diode connection, and an emitter coupled to the laser and a second transistor having a base coupled to the base of the first transistor, a collector coupled to a voltage source and an emitter coupled to a sensed voltage of an induced current that passes through the second transistor, the induced current being induced by the modulation current passing through the first transistor; and a control module that is capable of performing the following:

determining the actual modulation current of the laser using the voltage data; and modifying the actual modulation current provided to the laser.

9. The optical transmitter as defined in claim 8, wherein the sensor is an analog sensor, and wherein the optical transmitter is further capable of converting analog voltage data of the sensor to digital voltage data.

10. The optical transmitter as defined in claim 8, wherein the optical transmitter is an optical transceiver module, and wherein the sensor is included in a laser driver included in the optical transceiver module.

11. The optical transmitter as defined in claim 10, wherein the sensor is included as a part of a current mirror.

12. The optical transmitter as defined in claim 8, wherein the control module is configured to accept instructions external to the optical transmitter in modifying the actual modulation current.

13. The optical transmitter as defined in claim 12, wherein the external instructions are provided by an external host with which the optical transmitter is operably connected.

14. The optical transmitter as defined in claim 8, wherein the control module is a processor containing microcode, wherein the microcode when executed causes the processor to determine the actual modulation current and modify the actual modulation current.

15. A method for modifying the modulation current of a laser disposed in an optical transceiver module, the method comprising:

sensing analog voltage data, the analog voltage data being relating to an actual modulation current of the laser, wherein the sensing is at least partially performed by a first transistor having a collector coupled to one portion of a differential pair that carries the modulation current, the collector coupled to the base in a diode connection, and an emitter coupled to the laser and a second transistor having a base coupled to the base of the first transistor, a collector coupled to a voltage source and an emitter coupled to a sensed voltage of an induced current that passes through the second transistor, the induced current being induced by the modulation current passing through the first transistor;

converting the analog voltage data to digital voltage data;

determining the actual modulation current of the laser using the digital voltage data;

determining a desired modulation current; and if needed, modifying the actual modulation current to match the desired modulation current.

16. The method for modifying as defined in claim 15, wherein converting the analog voltage data, determining the actual modulation current, and determining the desired modulation current are performed by a control module having a processor capable of executing microcode.

17. The method for modifying as defined in claim 16, wherein determining the desired modulation current and modifying the actual modulation current are performed autonomously by the control module.

18. The method for modifying as defined in claim 17, wherein determining the desired modulation current includes determining a slope efficiency for the laser.

19. The method for modifying as defined in claim 18, wherein modifying the actual modulation current further includes:

modifying the actual modulation current to match the desired modulation current so as to establish or maintain one of the following: optical modulation amplitude and extinction ratio.

* * * * *